United States Patent [19]

Tokieda et al.

[11] Patent Number: 4,482,350
[45] Date of Patent: Nov. 13, 1984

[54] REACTIVE DYE COMPOSITION FOR CELLULOSE FIBER

[75] Inventors: Takemi Tokieda, Nara; Sadaharu Abeta, Toyonaka, both of Japan

[73] Assignee: Sumitomo Chemical Company, Limited, Osaka, Japan

[21] Appl. No.: 466,303

[22] Filed: Feb. 14, 1983

[30] Foreign Application Priority Data

Feb. 19, 1982 [JP] Japan .................... 57-26509

[51] Int. Cl.³ .................... C09B 67/24; D06P 1/38
[52] U.S. Cl. .................................. 8/524; 8/527; 8/549; 8/589; 8/692; 8/918
[58] Field of Search ............ 8/524, 527, 549, 589

[56] References Cited

U.S. PATENT DOCUMENTS

| 4,088,441 | 5/1978 | Meininser et al. | 8/549 |
| 4,149,850 | 4/1979 | Schlafer et al. | 8/527 |
| 4,264,323 | 4/1981 | Capponi et al. | 8/527 |
| 4,283,195 | 8/1981 | Nakatsuka et al. | 8/524 |
| 4,349,349 | 9/1982 | Nakatsuka et al. | 8/527 |
| 4,415,333 | 11/1983 | Schlafer | 8/524 |

FOREIGN PATENT DOCUMENTS 61151 9/1982 European Pat. Off. .

Primary Examiner—A. Lionel Clingman
Attorney, Agent, or Firm—Stevens, Davis, Miller & Mosher

[57] ABSTRACT

A reactive dye composition which comprises a combination of 20 to 99% by weight of a dye represented by a free acid of the formula,

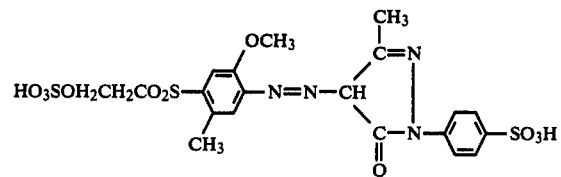

and 1 to 80% by weight of an alkylnaphthalenesulfonic acid/formaldehyde condensate having a sulfonation degree of 50 to 150% and an average condensation degree of 1.1 to 3.0, which is very readily soluble in water and aqueous alkali liquors, resistant to coagulation when prepared into a color paste for printing, and useful for dyeing or printing cellulose fiber materials yellow with a high color yield, particularly by a one-bath pad dyeing method or printing method.

7 Claims, No Drawings

REACTIVE DYE COMPOSITION FOR CELLULOSE FIBER

The present invention relates to a reactive dye composition suitable for dyeing cellulose fiber materials. More specifically, the present invention relates to a reactive dye composition readily soluble in water and aqueous alkali liquors to give a yellow color with a high color yield.

Generally speaking, so-called one-bath pad dyeing methods, such as a one-bath pad-batch method, a one-bath pad-dry method and a one-bath pad steam method have been effectively applied for dyeing natural and regenerated cellulose fiber materials. For these methods, however, it is essential for dyes to have a high solubility in aqueous alkali liquors. For example, in the one-bath pad-batch method, about 100 parts by weight of a dye should be dissolved in 1,000 parts by weight of an aqueous solution containing an alkali such as sodium hydroxide, sodium carbonate or trisodium phosphate and an electrolyte such as sodium sulfate.

In a printing, a color paste prepared may be often stored for a certain period before use for printing cellulose fiber materials. Therefore dyes are required to have a high resistance to coagulation.

As well known, there are many dyes having β-sulfatoethylsulfonyl group as a fiber reactive group, which have been used for dyeing cellulose fiber materials as so-called vinylsulfone type reactive dyes, but it is very difficult to find this kind of reactive yellow dye which is advantageous from industrial point of view, readily soluble in aqueous alkali liquors and highly resistant to coagulation.

For improving the solubility of vinylsulfone type reactive dyes, a method which comprises providing a dye composition containing a naphthalenesulfonic acid/formaldehyde condensate and a reactive dye is known.

According to this method, however, large amounts of the naphthalenesulfonic acid/formaldehyde condensate have to be added for obtaining a sufficient effect, and moreover the dye composition produced by that method is not satisfactory as regards dyeing efficiency, as is apparent from the following fact:

Vinylsulfone type reactive dye and sodium chloride or sodium sulfate are mixed to prepare a dye composition having the same dye content as that of the dye composition produced by the foregoing method; dyeing is carried out according to the foregoing one-bath pad dyeing method using a low dye concentration such that the sodium chloride- or sodium sulfate-containing dye composition is readily soluble in aqueous alkali liquors; on comparing the color depth (hereinafter referred to as color yield) of both dyed products, it can be found that the color yield of the former dye composition (improved in solubility) becomes equal to that of the latter dye composition by increasing the amount by 2 to 5% by weight. Also, in a dip dyeing method not required high solubility of the dye unlike the one-bath pad dyeing method, the color yield of the former dye composition is rather low, as compared with the latter one.

Under such circumstances, the present inventors have extensively studied to find vinylsulfone type reactive dye capable of dyeing cellulose fiber materials yellow, which is advantageous from industrial point of view, readily soluble in aqueous alkali liquors and highly resistant to the coagulation, and as a result found that a combination of a specific vinylsulfone type reactive dye and a specific alkylnaphthalenesulfonic acid/formaldehyde condensate can accomplish the object.

The present invention provides a reactive dye composition comprising a combination of 20 to 99% by weight, preferably 60 to 80% by weight, of a reactive dye represented by a free acid of the formula (1),

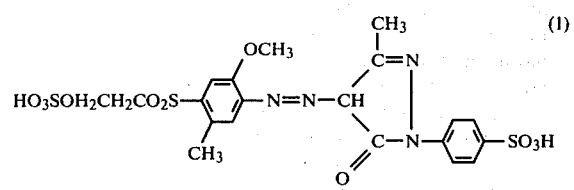

and 1 to 80% by weight, preferably 20 to 40% by weight, of an alkylnaphthalenesulfonic acid/formaldehyde condensate having a sulfonation degree of 50–150%, preferably 80–120%, and an average condensation degree of 1.1–3.0, preferably 1.5–2.5.

The dye composition of the present invention exhibits a markedly excellent solubility in various aqueous alkali liquors and can give a uniformly and deeply dyed product having no speck with a high dyeing efficiency and a high color yield even by the foregoing one-bath pad dyeing methods.

When prepared into a color paste for printing, it exhibits a high resistance to coagulation, so that the color paste comprising sodium bicarbonate shows no coagulation of dye even after storage at 25° C. for one week.

The alkylnaphthalenesulfonic acid/formaldehyde condensate usable in the present invention is commercially available and can be prepared by a process which is well known in itself.

The alkylnaphthalenesulfonic acid usable the preparation of said condensate includes methylnapthalalenesulfonic acid, ethylnaphthalenesulfonic acid, propylnaphthalenesulfonic aicd, butylnaphthalenesulfonic acid and the like.

These alkylnaphthalenesulfonic acids may be used each alone or in a mixture of two or more. The sulfonation degree of these alkylnaphthalenesulfonic acids, which can be controlled by varying the reaction temperature, is 50 to 150%, preferably 80 to 120%, on the average (sulfonation degree of 100% means that 1 mole of sulfonic acid is linked to 1 mole of alkylnapthalene).

The alkylnaphthalenesulfonic acid/formaldehyde condensates may be used as an alkali metal salt, and their average condensation degree is 1.1 to 3.0, preferably 1.5 to 2.5. These condensates are obtained as a mixture of condensates having various condensation degrees. The average condensation degree can be controlled by varying the amount of foraldehyde against the amount of alkylnaphthalenesulfonic acid.

The dye compositions of the present invention may contain hydrotropic agents (e.g. urea, anthraquinone-2-sulfonic acid) and builders having little or no effect on the solubility of the dye compositions (e.g. dextrin, sucrose). Further, electrolytes (e.g. sodium chloride, sodium sulfate) in small amounts which exert no adverse effect on the solubility of the dye compositions, dust-preventing agents (e.g. mineral oil emulsions), pH stabilizers (e.g. disodium hydrogen phosphate) and water softeners (e.g. polyphosphates) may be added to the dye compositions of the present invention.

The dye compositions of the present invention can be obtained by thoroughly mixing 20 to 99% by weight, preferably 60 to 80% by weight, of the reactive dye of the formula (1), 1 to 80% by weight, preferably 20 to 40% by weight, of the aforesaid condensate and, if necessary, the aforesaid additives according to conventional methods well known to those skilled in the art.

The dyeing of natural or regenerated cellulose fiber materials can be performed in accordance with the one-bath pad dyeing methods including one-bath pad-batch method, one-bath pad-dry method and one-bath pad-steam method, and other conventional dyeing methods, i.e. two-bath pad dyeing, printing and exhaustion dyeing methods, whereby deep dyeings having excellent levelness and no specks can be obtained.

More concretely speaking, for example, the dye composition of the present invention is dissolved in water or mixed with a printing paste and then mixed with an alkali and, if desired, additives as described above, to prepare a dyeing medium having a predetermined dye concentration (for example, padding liquor or color paste). Alternatively, the dyeing medium can be prepared by mixing the reactive dye of the formula (1) and the above-defined condensate together with an alkali, if desired additives as described above, in an aqueous medium. The fiber materials are contacted with the dyeing medium, and then the materials are allowed to stand or subjected to steam treatment or dry heat treatment, thereby fixing the reactive dye to the materials.

The present invention is explained in more detail with reference to the following Examples, which are only illustrative and are not intended to limit the scope of the present invention. In the Examples, parts are by weight.

EXAMPLE 1

Sixty eight parts of a dry cake, having a purity of 46%, of a dye represented by the following formula:

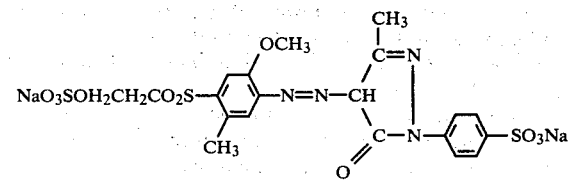

was thoroughly mixed with 31 parts of sodium salt of ethylnaphthalenesulfonic acid/formaldehyde condensate (sulfonation degree 100%, average condensation degree 2.5) and 1 part of mineral oil emulsion to prepare a dye composition.

(a) One hundred grams of the dye composition thus obtained was dissolved into hot water and cooled to 25° C. After adding 15 ml of 32.5% aqueous solution of sodium hydroxide and 150 g of water-glass (50° Bé) to the solution, the resulting mixture was diluted with water to make the volume one liter at 25° C. Immediately, the solution thus obtained was used as a padding solution to pad a cotton fabric. The padded cotton fabric was batched up, tightly sealed with a polyethylene film and allowed to stand at 20° C. for 20 hours in a room. The dyed fabric was rinsed with cold water and then with hot water, soaped with a boiling detergent solution, again rinsed with cold water and dried. Thus, there was obtained a very deeply yellow-dyed product having no speck.

(b) When the padding solution of (a) was allowed to stand at 25° C. for 90 minutes, no deposition of dye was observed at all. Thereafter, cotton fabric was dyed in the same manner as in (a). Thus, a uniformly and very deeply dyed product having no speck was obtained.

(c) Fifty grams of the dye composition obtained above was dissolved into 300 g of hot water. After adding 50 g of urea to the solution, the resulting mixture was cooled to 25° C. Then, a color paste was prepared therefrom by adding thereto 555 g of Duckalgin NSPM [5% paste, manufactured by Kamogawa Kasei Co.], 20 g of sodium m-nitrobenzenesulfonate, 5 g of sodium hexamethaphosphate and 20 g of sodium bicarbonate, and then adjusting the total weight to 1,000 g. With the color paste thus obtained, a cotton fabric was printed by the screen process. After drying, the printed fabric was steamed at 100° C. for 5 minutes and then washed first with cold water and subsequently with hot water, soaped with boiling detergent solution, again washed with cold water and dried to finish it. Thus, a very deeply yellow-printed product having no speck was obtained.

(d) When the printing color paste of (c) was allowed to stand at 25° C. for one week, no deposition of dye was observed at all. Thereafter, cotton fabric was printed with this color paste in the same manner as in (c), a uniformly and very deeply printed product having no speck was obtained.

COMPARATIVE EXAMPLE 1

Sixty eight grams of the same dry cake of dye as in Example 1 was thoroughly mixed with 31 parts of a naphthalenesulfonic acid/formaldehyde condensate (sulfonation degree 100%, average condensation degree 5) and 1 part of mineral oil emulsion to prepare a dye composition.

(a) From 100 g of the dye composition thus obtained, a padding solution was prepared according to (a) of Example 1. Just after preparation of the solution, no deposition of dye was observed. When the solution was used for the pad-dyeing of a cotton fabric, a dyed product having no speck was obtained.

(b) When the padding solution of (a) was allowed to stand at 25° C. for 30 minutes, a large amount of dye was deposited. When this padding solution was used for the pad-dyeing of a cotton fabric, nothing was obtained other than a dyed product having very many specks and therefore having no practical value.

(c) From 50 g of the dye composition obtained above, a printing color paste was prepared according to (c) of Example 1. Just after preparation of the paste, no coagulation of dye was found, and the paste gave a printed product having no speck when used for the printing of cotton fabric.

(d) When the color paste of (c) was allowed to stand at 25° C. for 24 hours, a large amount of coagulated dye was deposited. When this paste was used for the printing of cotton fabric, nothing was obtained other than a printed product having many specks and therefore having no practical value.

EXAMPLE 2

Seventy nine parts of a dry cake, having a purity of 45%, of a dye represented by the following formula:

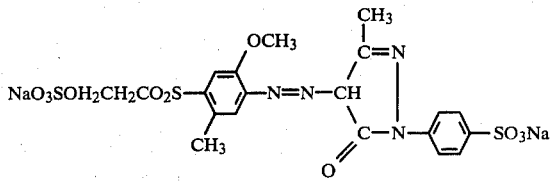

was thoroughly mixed with 20 parts of sodium salt of methylnaphthalenesulfonic acid/formaldehyde condensate (sulfonation degree 110%, average condensation degree 1.8) and 1 part of mineral oil emulsion to prepare a dye composition.

(a) From 100 g of the dye composition thus obtained, a padding solution was prepared according to (a) of Example 1. When the padding solution just after being prepared was used for pad-dyeing of a cotton fabric, a uniformly dyed product having no speck was obtained, and color depth in this dyed product was the same as that of the dyed product obtained in (a) of Example 1.

(b) When the padding solution of (a) was allowed to stand at 25° C. for 70 minutes, no deposition of dye was observed. When this solution was used for the pad-dyeing of cotton fabric, a uniformly dyed product having no speck was obtained.

EXAMPLE 3

Eighty parts of a dry cake, having a purity of 45%, of a dye represented by the following formula:

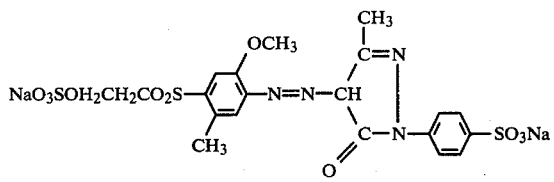

was thoroughly mixed with 20 parts of sodium salt of a 42.1:17.9:40.0 mixture of α-methylnaphthalenesulfonic acid, β-methylnaphthalenesulfonic acid and dimethylnaphthalenesulfonic acid/formaldehyde condensate (sulfonation degree 100%, average condensation degree 1.8), to prepare a dye composition.

(a) One hundred grams of the dye composition thus obtained was dissolved into hot water and cooled to 25° C. After adding 16 g of sodium hydroxide solution (38° Bé) and 30 g of anhydrous sodium sulfate to the solution, the resulting mixture was diluted with water to make the volume one liter at 25° C. to prepare a padding solution.

With this padding bath, a cotton knit was padded at a squeeze rate of 110%, and then it was batched up, sealed into polyethylene film and allowed to stand at 20° C. for 20 hours in a room. Subsequently, the dyed product was rinsed with cold water, and then with hot water, soaped with a solution containing 1 g/liter of detergent (Monogen, manufactured by Daiichi Kogyo Seiyaku Co.) at 98° C. for 5 minutes, again rinsed with cold water and then dried. Thus, a very deeply yellow-dried product having no speck was obtained.

(b) When the padding solution of (a) was allowed to stand at 25° C. for 90 minutes, no deposition of dye was observed at all. When this padding solution was used for cold pad batch dyeing of cotton knit in the same manner as in (a), a uniformly and very deeply dyed product having no speck was obtained.

(c) Fifty grams of the dye composition thus obtained was dissolved into 300 g of hot water. After adding 50 g of urea, the solution was cooled to 25° C. A color paste was prepared therefrom by adding thereto 555 g of Duckalgin NSPM [5% paste, manufactured by Kamogawa Kasei Co.], 20 g of sodium m-nitrobenzensulfonate, 5 g of sodium hexamethaphosphate and 20 g of sodium bicarbonate and diluting the mixture with water to make a total quantity 1,000 g.

With the color paste thus obtained, a cotton fabric was printed by the screen process. After drying, the printed fabric was steamed at 100° C. for 5 minutes, and then the dyed product was washed with cold water, washed with hot water, soaped, again washed with cold water and then dried to finish it. Thus, a very deeply yellow-dyed product having no speck was obtained.

(d) When the printing color paste of (c) was allowed to stand at 25° C. for one week, no deposition of dye was observed at all. Thereafter, cotton fabric was printed in the same manner as in (c), a uniformly and very deeply dyed product having no speck was obtained.

What is claimed is:

1. A reactive dye composition comprising a combination of 20 to 99% by weight of a dye represented by a free acid of the formula,

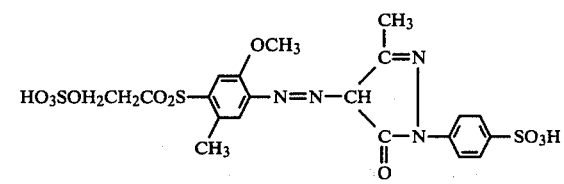

and 1 to 80% by weight of an alkylnaphthalenesulfonic acid/formaldehyde condensate having a sulfonation degree of 50 to 150% and an average condensation degree of 1.1 to 3.0.

2. A reactive dye composition according to claim 1, wherein the alkylnapthalenesulfonic acid is at least one member selected from methyl-, ethyl-, propyl- and butylnaphthalene sulfonic acids.

3. A reactive dye composition according to claim 1, wherein the composition further comprises at least one member selected from hydrotropic agents, builders, electrolytes, dust-preventing agents, pH stabilizers and water softeners.

4. A method for dyeing or printing cellulse fiber materials, which comprises using a reactive dye composition comprising a combination of 20 to 99% by weight of a dye represented by a free acid of the formula,

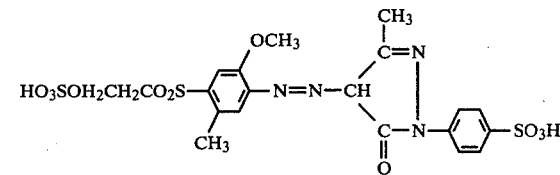

and 1 to 80% by weight of an alkylnaphthalenesulfonic acid/formaldehyde condensate having a sulfonation degree of 50 to 150% and an average condensation degree of 1.1 to 3.0.

5. A method for dyeing or printing cellulose fiber materials, which comprises dissolving a reactive dye composition comprising a combination of 20 to 99% by weight of a dye represented by a free acid of the formula,

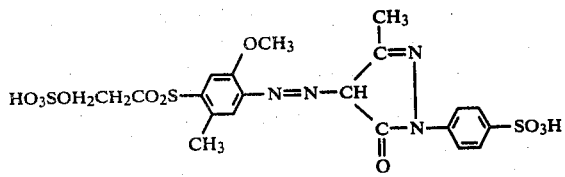

and 1 to 80% by weight of an alkylnaphthalenesulfonic acid/formaldehyde condensate having a sulfonation degree of 50 to 150% and an average condensation degree of 1.1 to 3.0 in water, adding water or a printing paste to the solution to prepare a dyeing medium having a predetermined dye concentration, adding an alkali and if desired additives to the medium, and contacting the fiber materials with the medium, followed by steam treatment or dry heat treatment or by allowing to stand to fix the dye to the fiber materials.

6. Cellulose fiber materials dyed by the method of claim 4.

7. Cellulose fiber materials dyed by the method of claim 5.

* * * * *